Oct. 29, 1957 F. P. ANDERSON ET AL 2,811,269
TRUCK HAVING REMOVABLE BODY
Filed Nov. 12, 1954 2 Sheets-Sheet 1
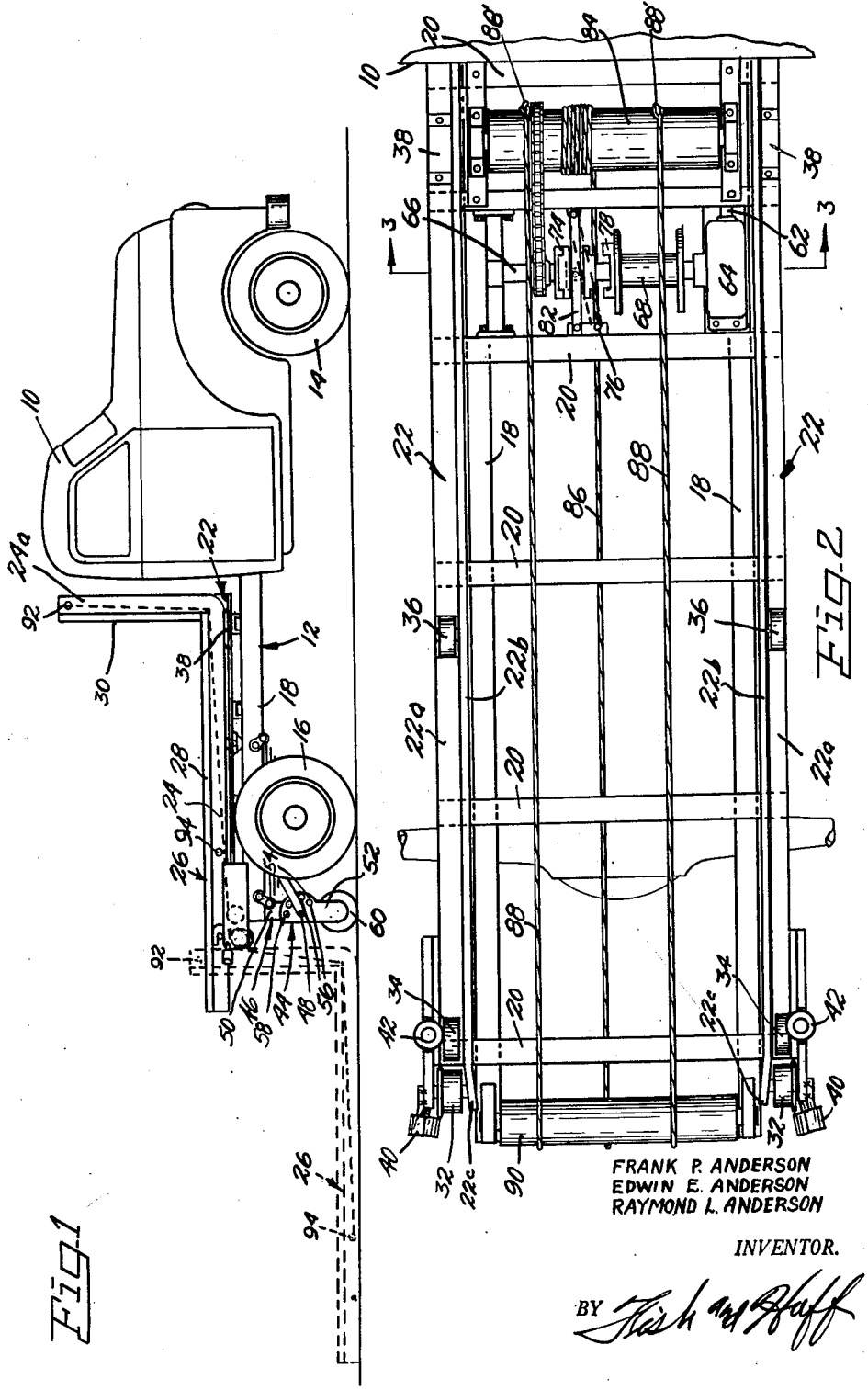
FRANK P. ANDERSON
EDWIN E. ANDERSON
RAYMOND L. ANDERSON
INVENTOR.

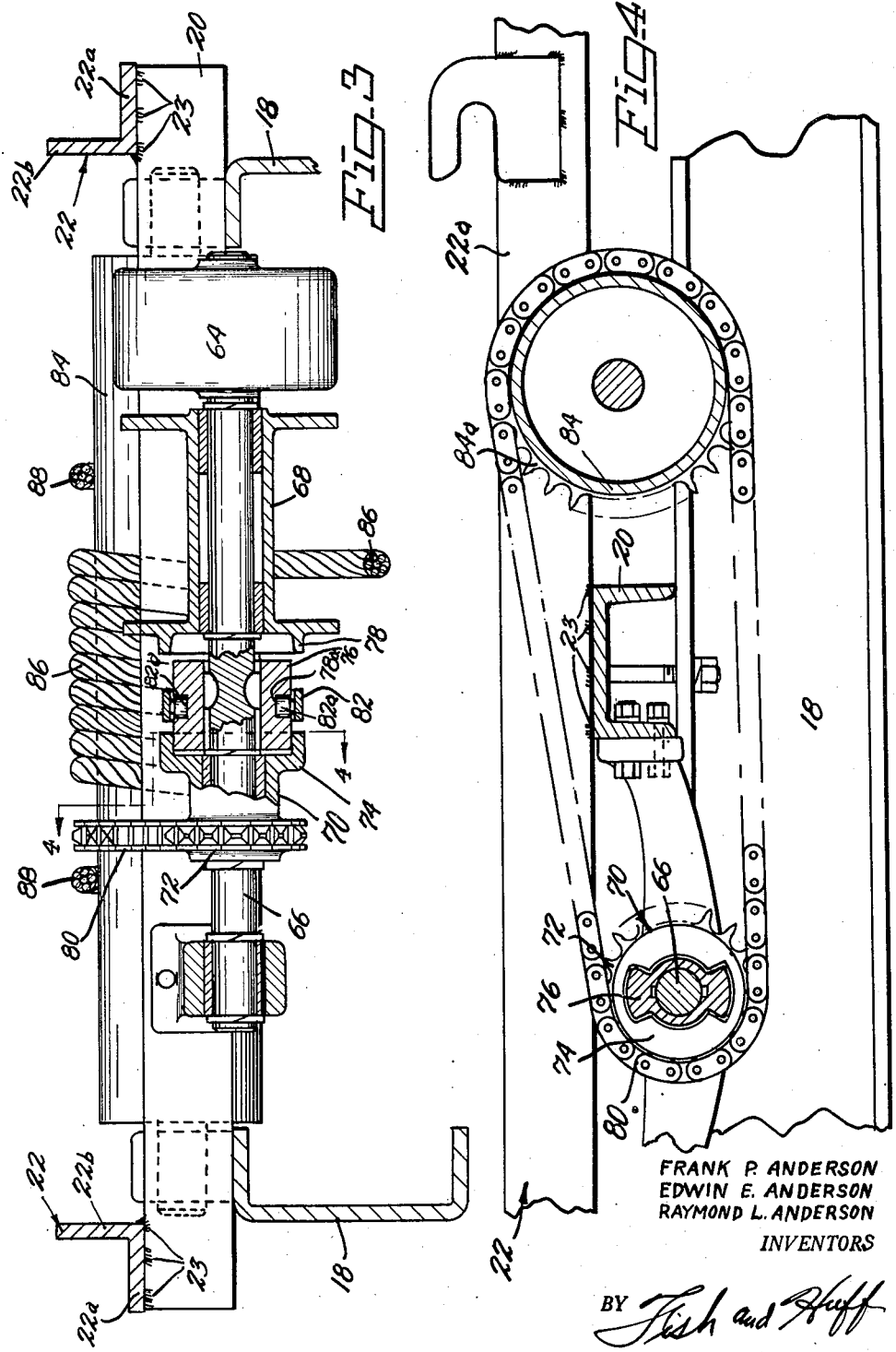

United States Patent Office 2,811,269
Patented Oct. 29, 1957

2,811,269

TRUCK HAVING REMOVABLE BODY

Frank P. Anderson, Edwin E. Anderson, and Raymond L. Anderson, Spokane, Wash.

Application November 12, 1954, Serial No. 468,424

2 Claims. (Cl. 214—517)

Our present invention relates to trucks of the motor vehicle type and more particularly to a truck having a bed operable from a normal position on the truck to an unloading position in which it is resting upon the ground, and constitutes an improvement over our prior Patent No. 2,580,501 of January 1, 1952.

One object of the invention is to provide in a truck having a body, so mounted upon the chassis of the truck that the body may be shifted from a position in which it rests upon the chassis to a position in which it is disposed rearwardly of the chassis and rests upon the ground for the purpose of loading and unloading material and then shifted upwardly and forwardly onto the chassis, improved guide means for guiding movement of said body onto and off of the chassis.

Another object of the invention is to provide a truck of the class described with a support which is movable into and out of operative positions for the purpose of stabilizing the truck during movements of the body onto and off of the truck chassis.

Another object of the invention is to provide improved means for motivating movements of said body, which includes a clutch alternately engageable with the body moving cable drum and a merchandise loading cable drum.

Another object of the invention is to provide a truck having a body mounted for longitudinal shifting movement relative to the chassis and vertical tilting movement, the body being moved by mechanism driven from the conventional power take-off of the truck and manually controllable to move the body and stop its movement at any desired location intermediate its normal position in which it rests upon the chassis, to its loading position in which it rests upon the ground back of the chassis.

These and other objects of the invention will become apparent during the course of the following description.

In the accompanying drawings forming a part of this specification and in which like numerals are employed to designate like parts, Figure 1 is a side elevation of the improved truck showing the body in normal position in full lines and in the lowered position by broken lines;

Figure 2 is a horizontal plan view, upon an enlarged scale, of the truck chassis with the body removed;

Figure 3 is a still further enlarged transverse vertical cross section taken on the plane of line 3—3 of Figure 2; and Figure 4 is a vertical longitudinal cross section taken on the planes of line 4—4 of Figure 3.

In our present disclosure, the truck constituting the improved invention has a conventional cab 10, a chassis 12, and front and rear wheels 14 and 16. The chassis has the usual longitudinally extending chassis bars 18. Spaced along the length of the chassis bars 18, we provide a number of cross bars 20, which are secured to the top edges of the chassis bars 18 in any convenient manner. The ends of the cross bars 20 extend beyond the lateral marginal limits of the chassis 12, and upon their end portions support longitudinally extending rails 22, one at each side of the chassis 12.

Inspection of Figure 3 will disclose that the rails are L-shaped in cross section and each has a horizontal lip 22a and a vertical flange 22b. The horizontal lips 22a rest upon the cross bars 20 and are secured thereto in any convenient manner, such as by welding at 23. The vertical flanges 22b constitute guide means for cooperation with runners 24 which form a portion of the truck body 26.

The runners 24 carry a platform or bed 28. At the forward end, the body 26 is provided with a vertical end wall 30 which is supported upon vertical front end portions 24a of the runners 24. It will be understood that the pair of runners 24 are laterally spaced coincident with the spacing of the rails 22, and the guide rail flanges 22b cooperate with the runners 24 to maintain the body in proper lateral relationship to the chassis during movement thereon.

At their rear ends, the rails 22 have their flanges 22b bent inwardly at 22c to provide angular portions and thus eliminate the possibility of the rails 24 striking the flanges 22b and interfering with proper movement of the body 26. Also at their rear ends, the guide rails 22 are provided with flanged guide rollers 32 which are disposed in vertical planes coincident with the axes of their respective rails. The guide rollers 32 have their peripheral faces disposed rearwardly of the rails 22 and spaced below the upwardly presented horizontal plane of the lips 22a. Immediately forward of the guide rollers 32 we provide support rollers 34 which are coaxial with each other and are disposed in the planes of their companion guide rollers, and these support rollers 34 have their peripheral faces disposed upwardly spaced from said plane of the guide rail lips 22a for the purpose of supporting the runners 24 and preventing their sliding upon the lips 22a of the guide rails 22. Intermediate the length of each rail 22, we provide other support rollers 36 coincident with the plane of the cooperating rollers of each rail. Adjacent to their forward ends, each rail 22 is provided with a wear plate 38, upon which the forward ends of the runners 24 rest when the body 26 is in its normal position. At their rear ends, the rails 22 are provided with rollers 40 journaled on horizontal axes to guide vertical movement of the vertical front end portions 24a of the runners 24, and other rollers 42 spaced forwardly therefrom and disposed on vertical axes to prevent undue side movement of the body 26 during movement onto and off of the chassis 12 when in a tilted or angled position relative to the chassis.

During operation of a physical embodiment of our invention, we found that when shifting the body 26 off of or onto the chassis 12 with a heavy load, such as a five ton tractor, it is necessary that the truck move relative to the body 26 after the body has tilted over the rollers 32 and 34, and the rear end thereof has contacted the ground. We also found that it was necessary to provide a mobile support for the rear end of the truck chassis 12 to prevent tilting of the truck over the rear wheels. We therefore have provided means for supporting the rear end of the chassis, indicated in general by the numeral 44, and which is seen in Figure 1 to constitute a chassis support leg 46 hinged at 48 intermediate its length and defining an upper section 50, which is rigidly supported from the chassis 12 in perpendicular relationship to the chassis, and a lower section 52 which is tiltable in a vertical plane from a position in axial alignment with the upper section 50 to a position at substantially right angles thereto. The lower section is provided with a quadrant 54 having a plurality of apertures 56 adapted to align with an aperture (not shown) extending laterally through the upper section 50, and selected angular positions of the support are effected by placing a pin 58 through the aligned apertures with leg in a selected position.

At its lower end, the tiltable section 52 of the leg 46 is provided with a roller 60 which rests upon the surface of the ground during movements of the body 26 from and to the chassis, supporting the chassis and yet permitting movement of the truck relative to the ground after the body 26 has contacted the surface of the ground.

We have also further improved the means for shifting the body 26 longitudinally off of and onto the chassis 12. Inspection of Figures 2, 3, and 4 will reveal that we have provided a manually controllable source of rotary motion 62, which is a mechanical extension of the conventional power takeoff from the transmission of the truck. The rotary motion thus supplied is connected to drive a suitable power transmission and reduction mechanism 64, which is operably connected to rotate a laterally extending horizontal power shaft 66 journaled on the chassis 12. Journaled on the power shaft 66 and confined against movement axially thereof, we provide a cable drum 68 which has means (not shown) for releasably connecting a cable thereto. Also journaled on the power shaft 66 and fixed against movement axially thereof, in spaced relation to the drum 68, we provide a motion transmitting element 70, which in the present disclosure includes a conventional chain sprocket 72 and a clutch plate 74.

Splined or otherwise secured to the power shaft 66 for rotation therewith, intermediate the cable drum 68 and the motion transmitting element 70, we provide a clutch element 76 which is movable axially of the shaft 66 and rotatable therewith. The clutch element is adapted to successively cooperate with the clutch plate 74 of the motion transmission element 70, and the clutch plate 78 of the drum 68 when disposed in its alternate positions.

As seen in Figure 3, the clutch element 76 is disposed in cooperation with the clutch plate 74, therefore rotation of the power shaft 66 is transmitted to the sprocket 72, and a power transmission element 80, which is here shown to be a sprocket chain, is driven thereby. The clutch element 76 is provided with a peripheral groove 78a. Rollers 82a of a clutch actuating lever 82 provide means for shifting the clutch element 76 when the lever 82 is shifted from the full line position of Figure 2 to the broken line position, thus alternately disposing the clutch element 76 for coaction with the clutch plates 74 and 78.

A second cable drum 84, having means such as hooks 88' for releasably securing the ends of cables thereto, is journaled on the chassis 12 in parallel relation to the power shaft 66 and is spaced upon the chassis forwardly thereof. The cable drum 84 is provided with a power transmission element 84a which is shown to be a sprocket and cooperates with the sprocket chain 80 to transmit rotary motion from the power shaft 66 to the drum 84 when the clutch element 76 is engaged with the clutch plate 74.

It will also be noted that we have cables 86 and 88 wound in opposite directions upon the cable drum 84. The cable 86 operates as a removing cable and extends longitudinally of the truck under the cross bars 20 and under a cable guide roller 90 journaled on a horizontal laterally extending axis at the rear end of the chassis 12. From thence it extends upwardly and is secured to the body 26 at 92 on the upper ends of the vertical front end portions 24a of runners 24.

We have shown a pair of cables 88 which are body loading cables. However, more or less than two will be equally effective in some circumstances. These are wound in the opposed direction to that of 86 on the drum 84 and extend above the cross bars 20 and over the cable guide roller 90 and are thence secured at laterally spaced points under the body 26 as seen at 94. It will thus be seen that by actuating drum 84 in one direction, wherein cable 86 is wound thereon, cable 86 pulls the body 26 rearwardly off of the chassis 12 and as the body tilts over the rollers 32 and 34, the cables 88 tauten to prevent its dropping to the ground unobstructed. Continued winding of cable 86 and subsequent unwinding of cables 88 then permits the forward portion of the body 26 to lower at the end of the chassis by gravity. Counter rotation of drum 84 will cause cables 88 to wind, and they lift the front end of the body 22 onto the chassis and pull it forwardly thereon to the full line position of Figure 1.

As adequately disclosed in our prior patent, the body and guide rails include mechanisms for anchoring the body onto the chassis when in the normal position and thus prevent accidental displacement thereof.

Having thus described our invention, we claim:

1. In combination with a truck having a chassis adapted to be selectively supported and a body movable longitudinally of the chassis from a normal horizontal position supported upon the chassis to a lowered horizontal position at rest upon the ground back of the chassis; means for shifting the body longitudinally off of and onto the chassis comprising a manually controllable source of rotary motion, a horizontal laterally extending power shaft journaled on the chassis of said truck and operably connected to said source of rotary motion, a cable drum journaled on said power shaft for relative rotation thereon and fixed against longitudinal movement, a motion transmitting element journaled on said power shaft spaced from said drum and fixed against longitudinal movement thereon; a clutch element disposed intermediate said drum and said power transmission element and fixed to said shaft for rotation therewith and slidable longitudinally thereof into clutching engagement alternately with said drum and said motion transmitting element for alternate actuation thereof; a second cable drum freely journaled on said chassis and axially parallel with said power shaft; means on said second named drum for securing a plurality of cables thereto; and means operably uniting said second named drum and said power transmission element for rotation of said second named drum thereby.

2. A truck comprising a chassis having a support wheel at the rear end thereof, laterally extending parallel cross bars supported upon said chassis and extending beyond the lateral limits thereof; rails extending longitudinally of the chassis and supported on the end portions of said chassis bars; said rails being substantially L-shaped in cross section and constituting guides; rollers carried by each said rail in a common plane coincident with the axis of the respective rail; a body normally disposed over the chassis and including longitudinally extending runners resting upon said rollers and guided by said rails and movably mounting the body for longitudinal movement along the rails from its normal position over the chassis to a lowered loading and unloading position in which it rests flat upon the ground back of the chassis; coaxial flanged guide rollers carried at rear ends of said rails in the plane of said rollers and having their peripheral faces disposed rearwardly of said rails and spaced below the horizontal level thereof to guide movement of the body off of and onto the first named rollers; said runners having upwardly projecting forward portions disposed in position for cooperation with said flanged rollers to guide initial movement of said body onto said chassis; a drum rotatably mounted on the chassis adjacent the front end thereof; cables wound in opposite directions about said drum; a cable guide carried by the chassis at the rear end thereof; one cable extending rearwardly from the drum under the guide and connected to the body at a point above the guide when the body is in the lowered position; and another cable extending rearwardly from said drum over said guide and being secured under said body.

(References on following page)

References Cited in the file of this patent

UNITED STATES PATENTS

| | | |
|---|---|---|
| 1,562,364 | Reasoner | Nov. 17, 1925 |
| 1,678,329 | Clarke et al. | July 24, 1928 |
| 2,113,448 | Hewitt | Apr. 5, 1938 |
| 2,129,340 | Webber | Sept. 6, 1938 |
| 2,508,740 | Alvare | May 23, 1950 |
| 2,534,156 | Wyatt et al. | Dec. 12, 1950 |
| 2,580,501 | Anderson et al. | Jan. 1, 1952 |

FOREIGN PATENTS

| | | |
|---|---|---|
| 240,260 | Great Britain | Oct. 1, 1925 |